| United States Patent [19] | [11] Patent Number: 5,974,834 |
| Rijkens et al. | [45] Date of Patent: Nov. 2, 1999 |

[54] METHOD FOR BENDING AND/OR TEMPERING SHEET GLASS AND BENDING FRAME THEREFOR

[75] Inventors: Ludwic Johan Rijkens, Kerkrade, Netherlands; Hans Josef Thevissen, Heinsberg, Germany; Franz Stiel, Aachen, Germany; Juergen Schmitz, Herzogenrath, Germany; Alwin Timmermann, Cologne, Germany

[73] Assignee: Saint-Gobain Vitrage, Courbevoie, France

[21] Appl. No.: 08/894,232

[22] PCT Filed: Dec. 20, 1996

[86] PCT No.: PCT/FR96/02060

§ 371 Date: Dec. 22, 1997

§ 102(e) Date: Dec. 22, 1997

[87] PCT Pub. No.: WO97/23420

PCT Pub. Date: Jul. 3, 1997

[30] Foreign Application Priority Data

Dec. 22, 1995 [DE] Germany ............................ 195 47 935

[51] Int. Cl.⁶ .......................... C03B 21/00; C03B 23/00; C03B 29/00; C03B 31/00
[52] U.S. Cl. ................................ 65/104; 65/107; 65/114; 65/118; 65/273; 65/287; 428/426

[58] Field of Search .............................. 65/103, 104, 106, 65/107, 114, 115, 118, 273, 287, 288, 348; 428/426

[56] References Cited

U.S. PATENT DOCUMENTS

| 3,087,317 | 4/1963 | Carson et al. ............................ 65/107 |
| 3,257,185 | 6/1966 | Carson et al. ............................ 65/107 |
| 4,661,142 | 4/1987 | Bartisel et al. .......................... 65/348 |
| 5,118,335 | 6/1992 | Claassen et al. ......................... 65/348 |
| 5,401,286 | 3/1995 | Goolsbay et al. ........................ 65/106 |
| 5,501,717 | 3/1996 | Vehmas et al. ........................... 65/104 |
| 5,779,755 | 7/1998 | Kuster et al. ............................. 65/348 |

Primary Examiner—Stanley S. Silverman
Assistant Examiner—Jacqueline A. Ruller
Attorney, Agent, or Firm—Oblon, Spivak, McClelland, Maier & Neustadt, P.C.

[57] ABSTRACT

For a method for bending and tempering glass which has an opening, the glass is bent in the horizontal position using a bending frame (9) and is tempered on the bending frame (9). The bending frame in respect of its contour and of its geometric shape corresponds to the desired shape of the bent glass. During the bending operation and during the tempering operation the glass is supported, in the region around the edge of the opening, by an additional internal bending frame (12).

15 Claims, 2 Drawing Sheets

METHOD FOR BENDING AND/OR TEMPERING SHEET GLASS AND BENDING FRAME THEREFOR

TECHNICAL FIELD

The present invention relates to a method for bending and/or transporting and/or tempering glass with an opening, in a horizontal position, with the use of a bending frame supporting the glass along its entire periphery, having a geometric shape corresponding to the contour and to the desired shape of the glass. The invention also deals with a bending frame intended for carrying out the method.

BACKGROUND ART

In the usual methods for bending and tempering glass, as used, for example, in manufacturing curved motor vehicle glass, the glass to be bent is heated up to the bending temperature in the horizontal position inside a continuous furnace, is bent in a bending station and is heat tempered in a tempering station which follows, by rapid cooling in air. In all the known methods of this type bending frames which correspond in respect of their geometric configuration to the desired shape of the glass to be manufactured are used for the bending and/or for transporting the bent glass and/or for tempering. For example, such bending frames are used in the method known by the name of gravity bending as described in document DE 2 945 776 C2. In the case of this method, the flat glass to be bent is lifted up by a suction head, is deposited on such a bending frame and is conveyed therewith into the tempering station. In the case of the method known as compression bending, such bending frames are used as peripheral bending forms with which the glass is pressed against a convex upper bending form which covers the entire surface. In a conventional embodiment of the compression bending method, the bent glass is passed through a tempering station situated downstream with the aid of this bending frame used as a bending form. In another known embodiment of the compression bending method the glass pressed with such a bending frame is held by suction against the upper bending form and after the bending frame has been removed it is deposited on another frame with which it is then transported to the tempering station. There are also known methods for bending and tempering glass in which such bending frames are used only for transporting bent glass, while the bending force in the bending station is applied using other means, for example a flow of hot air flowing upwards or using press tools which cover the entire surface.

Insofar as such bending frames are used as frames for carrying the glass into the tempering station, they are provided, on their upper side, with projections or with recesses so that the blown air directed against the lower face of the glass can reach the region around the edge of the glass and thus cool this point rapidly enough to obtain the required tempering.

It has become evident that the known methods, in which the glass in its softened bendable state is bent with known bending frames and/or is carried by these, do not always lead to optimum results. In particular, when bending and/or tempering glass with an opening formed inside its face, it may happen that the bent glass exhibits in its bent profile discontinuities which have a disturbing optical effect. The presence of one or more openings inside the glass, which also in some circumstances have larger dimensions, may, however, be desired, for example when transmitters or receivers of signals have to be arranged inside the glass for electromagnetic radiation which is excessively attenuated if it has to pass through the glass. The discontinuities in the bent profile occurring in the case of glass provided with openings may arise both during the bending operation proper and after the bending operation proper, under the effect of gravity on the glass, while the glass is resting in the deformable state on the bending frame.

DISCLOSURE OF THE INVENTION

The object of the invention is to provide a method of the type mentioned in the preamble but which allows glass provided with an opening to be bent and/or tempered by means of a conventional bending installation or a conventional bending and tempering installation without bending discontinuities and/or deformations which are disturbing from the optical point of view appearing within the glass, particularly around the opening in the glass.

This objective is achieved according to the invention by the fact that the glass is mechanically supported in the region around the edge of the opening in the glass by support elements acting along the surface of the desired shape for the glass during the bending operation and/or during transportation from the bending station to the tempering station and/or during the tempering operation.

Particularly advantageously, the method according to the invention may be carried out in such a way that the glass, in the region around the edge of the opening in the glass, is supported by a support element in the form of a frame which supports the region around the edge of the opening in the glass along its entire periphery. As an alternative, the glass may also be supported in the region around the edge of the opening in the glass by a support element in the form of a plate which covers the entire surface, the shape of which corresponds to the opening in the glass, but which is a bit larger than this opening so that the region around the edge of the glass surrounding the opening rests on this surface along its entire length.

In an alternative form according to the invention, the glass is subjected to compression bending, that is to say that during the bending stage, the glass supported by the bending frame is pressed against a convex upper form, covering the entire surface of the glass. This upper form therefore advantageously presses the glass, and more specifically the region around the edge of the opening, against the support elements acting on the said edge region.

It has become evident that it is possible, using the method in accordance with the invention, to confer a defect-free bent shape even upon glass which has a relatively large opening, something which is particularly difficult to achieve when the opening is close to the edge of the glass.

The aim of the invention is also to obtain bent and/or tempered glass containing an opening, and in which the discontinuous faces, on account of the opening, have a continuous curvature. According to the invention, the glass although it has an opening and therefore discontinuous faces, has a continuous bent profile and therefore presents no defects around the edge of the opening which may lead to disturbing optical effects.

The opening could be intended to receive a transmitter and/or receiver of signals, such as a brake light, the latter being fixed so that it lies flush with at least one surface of the said glass, on the periphery of the opening. It is thus possible to set a transmitter and/or a receiver in, without needing the presence of a frame or molding acting as an insert between the transmitter and/or the receiver and the periphery of the opening; such inserts would have to be used to conceal defects in curvature around the hole and provide a seal against moisture, air and/or light if the glass were obtained according to the known bending techniques.

BRIEF DESCRIPTION OF THE DRAWINGS

Other features and advantages of the method in accordance with the invention will emerge from the dependent claims and from the following description of one preferred embodiment of an appropriate bending frame for the method according to the invention given with reference to the attached drawings.

In the drawings.

BEST MODE FOR CARRYING OUT THE INVENTION

Figure 1:
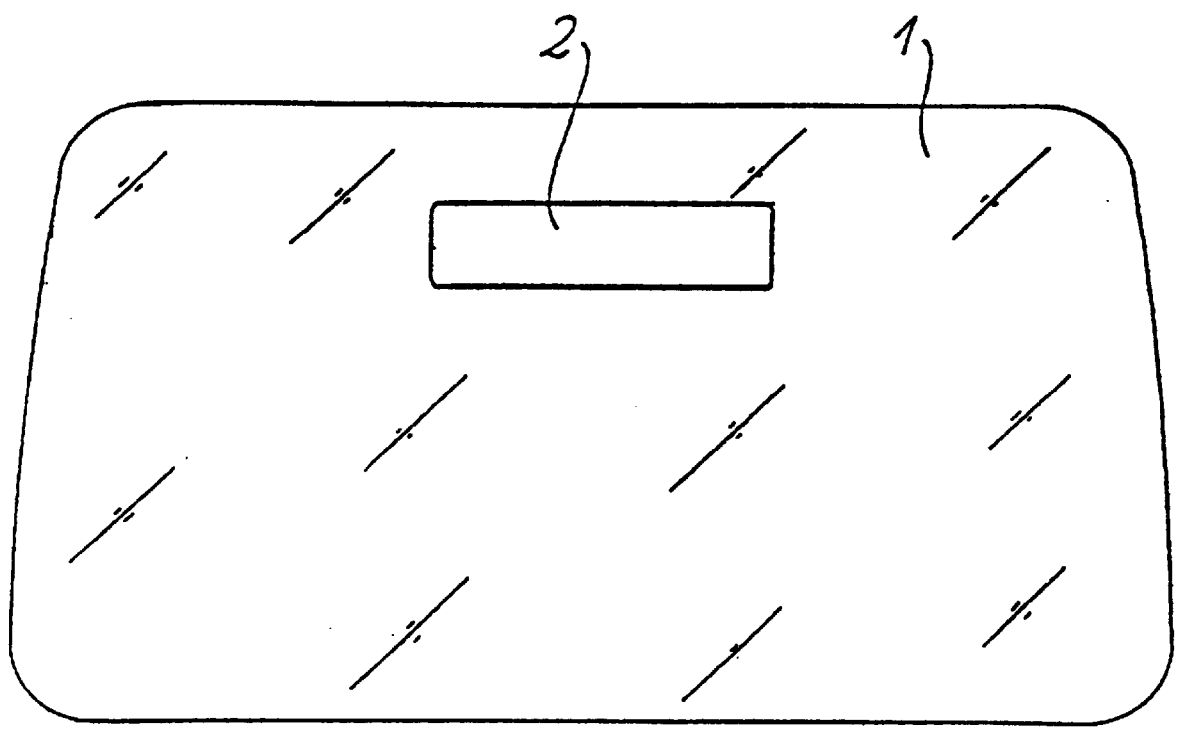
FIG. 1 shows glass, with an opening, which is to be bent spherically and tempered.

In the case of the glass 1 represented in FIG. 1, this is a motor car rear screen which is provided, in its upper part, with an opening 2. The opening 2 is to be used for the installation of an additional brake light which is to be fixed into this opening. The opening 2 in the glass is advantageously cut using a high-pressure water jet cutter with X-Y position control, the high-pressure water jet also containing an appropriate abrasive, for example in the form of corundum particles.

Openings of this type may be made using high-pressure water jet cutters which are commercially common, it of course being possible for other methods and devices according to the state of the art also to be used for cutting out the opening 2.

The glass 1 is to be bent according to the gravity bending method into a spherical shape and then heat tempered by rapid blowing of air. In this bending method, the flat glass with the opening 2 is heated in the horizontal position to the bending temperature in a continuous furnace, is grasped and raised when it has reached the bending temperature by a flat displaceable suction head and is conveyed using the suction head until it is vertically above a bending frame according to the invention, then released by the suction head above the bending frame. The glass therefore falls onto the bending frame and becomes applied thereto under the effect of the kinetic energy of dropping it and its self weight.

Because in this case the bending frame is, at the same time, used as a transport frame for transporting the bent glass to the tempering station and as a frame for carrying it during the tempering process, the bending frame has to be formed in such a way that the region around the edge of the glass is also tempered by the blown flow of air. In theory, constructions known for this such as those described, for example, in documents EP 0 186 529 B1, WO 93/02017 or U.S. Pat. No. 5,118,335 may be chosen for the configuration of the bending frame.

Figure 2:
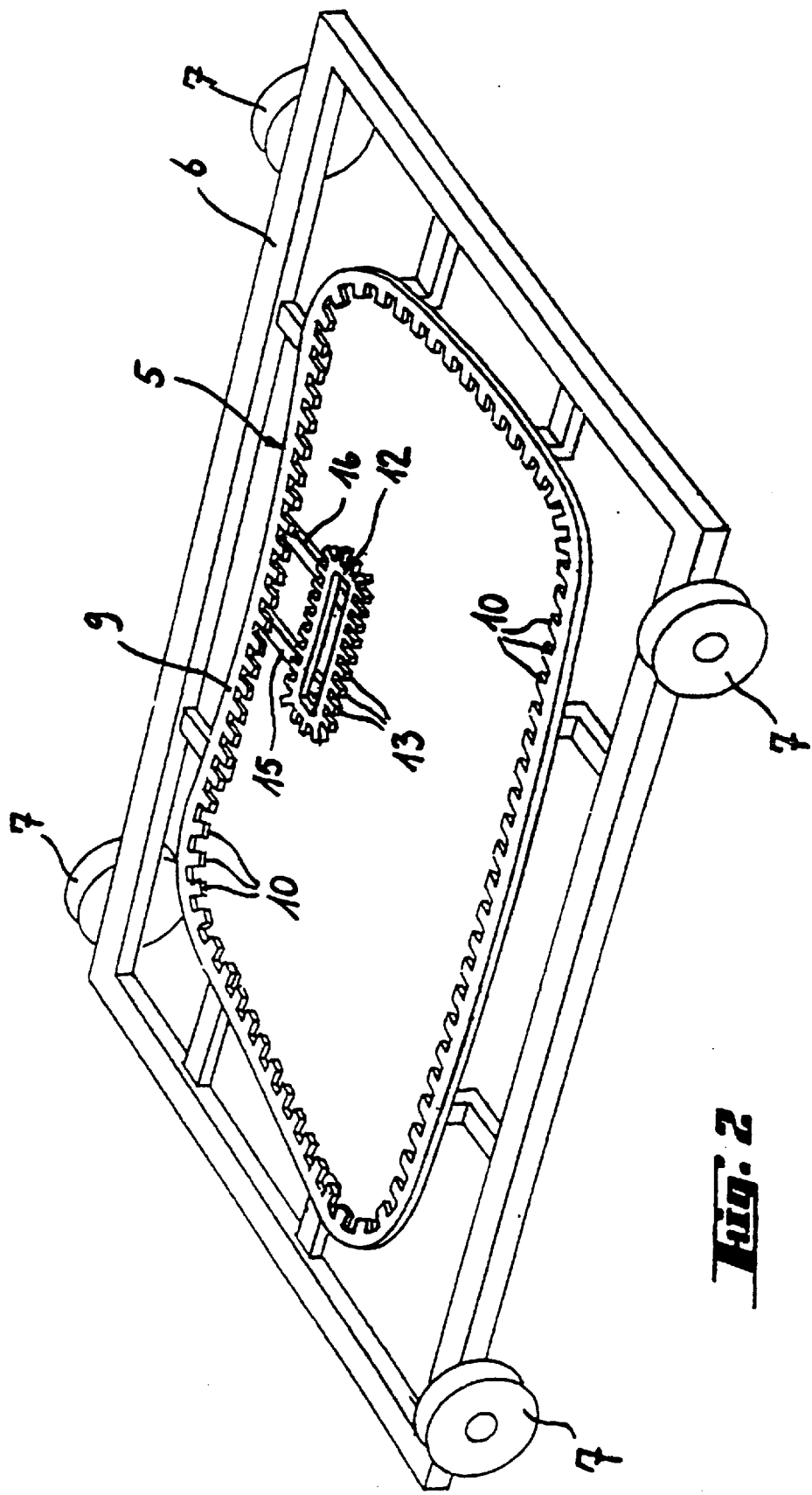
FIG. 2 shows a bending frame according to the invention for bending and tempering the glass represented in FIG. 1.

As FIG. 2 shows, the bending frame 5 is arranged on a carriage 6 which can be displaced along rails thanks to the wheels 7 inside a bending and tempering installation. The bending frame 5 comprises a closed outer frame 9, the shape of which corresponds to the contour and desired shape of the bent glass. The frame 9 is provided, in the known way, on its inner side, with finger-shaped projections, the spaces between which form flow channels for the cooling air. Inside the frame 9 at the point corresponding to the position of the opening in the glass 2 is a second frame 12 which is closed on itself. This frame 12 corresponds in respect of its shape and of its size to the shape and size of the opening in the glass 2. It is formed in such a way that on the one hand the edge of the opening in the glass is supported right along its periphery but so that, on the other hand, flow channels are again formed for the blown air by the presence of projections 13 so that the glass is also rapidly cooled by the blown air on the peripheral surface of the opening in the glass and is thus subjected to compressive stresses. The geometric surface shape of the bearing surface of this inner frame 12 has to be designed in accordance with the desired shape of the bent glass so that the glass, when applied against this inner frame 12, also adopts exactly the desired shape in the region close to the opening 2 without defects which are disturbing from the optical point of view appearing.

Both the outer frame 9 and the inner frame 12 may respectively be formed as a single piece or constructed of several parts which can be adjusted separately in terms of height so that subsequent adjustment and fine tuning of the bending frame become possible. The inner frame 12 is fixed removably to the outer frame 9 or to the frame of the carriage 6 by fixing pieces 15, 16. The same bending frame 9 can be used to manufacture glass with an opening, by optionally attaching the inner frame 12, and glass without an opening after removing the inner frame 12. Fixing may also be achieved in such a way that it allows fine tuning or a correction of the position of the frame 12.

We claim:

1. Method for supporting a glass with an opening, which comprises:

performing, during a transporting step, one of a bending step and a tempering step, using a frame having a shape substantially corresponding to the contour of the glass, said frame supporting the glass only along its periphery, and separately supporting a region around an edge of the opening in the glass.

2. Bending frame assembly having a shape corresponding to the contour and desired shape of a glass having an opening, which comprises:

a bending frame supporting the glass only along its periphery, said frame having a shape substantially corresponding to the contour of the glass; and a separate support element positioned inside the bending frame and which corresponds to the contour of the glass in the region corresponding with the region around the edge of the opening in the glass.

3. Method according to claim 2, which comprises supporting a region around the edge of the opening in the glass by a support element in the form of a frame which supports the edge of the opening around its entire periphery.

4. Method according to claim 1, which comprises supporting during the bending step, the glass by pressing the bending frame against a convex upper form.

5. Bending frame assembly according to claim 2, wherein the separate support element comprise a second frame which supports the region around the edge of the opening in the glass right around the contour thereof.

6. Bending frame assembly according to claim 2, wherein the support element comprises a plurality of parts which are fixed so as to be one of separately adjustable and adjustable together in terms of one of height and of inclination.

7. Bending frame assembly according to claim 2, wherein the separate support element is removably fixed to the bending frame corresponding to the contour of the glass.

8. Bending frame assembly according to claim 2, wherein the separate support element is provided, on a surface thereof which comes into contact with the glass, with at least one of a plurality projections and teeth which form flow channels for the blown air required for tempering.

9. Glass having an opening wherein the glass has discontinuous faces which have a continuous curvature and said glass comprises one of bent glass and tempered glass.

10. Method according to claim 1, which comprises pressing, during the bending step, the glass supported by the bending frame against a convex upper form.

11. Bending frame assembly according to claim 5, wherein the separate support element is removably fixed to the bending frame corresponding to the contour of the glass.

12. Bending frame assembly according to claim 6, wherein the separate support element is removably fixed to the bending frame corresponding to the contour of the glass.

13. Bending frame assembly according to claim 5, wherein the separate support element is provided, on a surface thereof which comes into contact with the glass, with at least one of a plurality of projections and teeth which form flow channels for the blown air required for tempering.

14. Bending frame assembly according to claim 6, wherein the separate support element is provided, on a surface thereof which comes into contact with the glass, with at least one of a plurality of projections and teeth which form flow channels for the blown air required for tempering.

15. Bending frame assembly according to claim 7, wherein the separate support element is provided, on a surface thereof which comes into contact with the glass, with at least one of a plurality of projections and teeth which form flow channels for the blown air required for tempering.

\* \* \* \* \*